United States Patent Office 3,220,935
Patented Nov. 30, 1965

3,220,935
PURIFICATION OF DI-SUBSTITUTED MALONYL HALIDES
Ronald G. Nations and Kent C. Brannock, Kingsport, Tenn., assignors to Eastman Kodak Company, Rochester, N.Y., a corporation of New Jersey
No Drawing. Filed Nov. 13, 1962, Ser. No. 237,315
11 Claims. (Cl. 202—57)

This invention relates to the preparation of di-substituted malonyl halides and more particularly to the purification of reaction mixtures containing the halides.

Dialkylmalonyl halides have been synthesized by a number of methods such as by reaction of dialkylketenes with phosgene or other carbonyl halides in a manner similar to the process described in the German Patent 1,027,-195. However, during the recovery of the dialkylmalonyl halides by distillation, even under reduced pressure, decomposition takes place leading to the release of volatile products which corrode the equipment. In addition, the yield is reduced and an impure product is obtained.

We have discovered that if a reaction mixture containing a di-substituted malonyl halide, such as a dialkylmalonyl halide, is subjected to distillation under atmospheric or sub-atmospheric pressure in the presence of certain stabilizing agents, substantially no decomposition of the halide takes place and yields as high as 95% of theory are obtained. In absence of the stabilizing agent, the yield is greatly reduced and in one procedure described in the following examples, no dialkylmalonyl halide was obtained due to decomposition.

The stabilizing agents of the invention which are used in the reaction mixtures containing the di-substituted halides are members of the following two classes of compounds:

(1) Tertiary aromatic diamines of the general formula

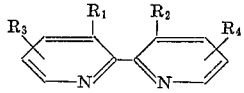

wherein $R_1$, $R_2$, $R_3$ and $R_4$ each represent hydrogen, a lower alkyl group, a monocyclic aryl group of the benzene series, halogen or a lower alkoxy group, for example, 2,2'-bipyridine

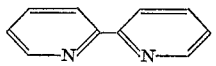

4,4'-diethyl-2,2'-bipyridine, 4,4'-diphenyl - 2,2'-bipyridine, 4,4'-dichloro-2,2'-bipyridine and 4,4'-diethoxy-2,2'-bipyridine; or $R_1$ and $R_2$ joined together represent a vinylene group necessary to complete a 1,10-phenanthroline radical, for example, 1,10-phenanthroline

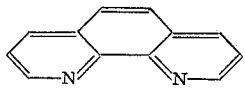

5-methyl-1,10-phenanthroline, 5-phenyl-1,10-phenanthroline, 5-chloro - 1,10 - phenanthroline, 2,9-dimethyl - 1,10-phenanthroline, 4,7-diphenyl-1,10-phenanthroline and the like.

(2) Tertiary amines and diamines containing a plurality of acetic acid residues, represented by the general formula $$R[N(CH_2CO_2H)_2]_n$$

wherein $n$ is 1 or 2, R is an acetic acid residue —$CH_2CO_2H$ where $n$ is 1, and R is an alkylene, cycloalkylene, or oxydialkyl radical containing 2 to 10 carbon atoms when $n$ is 2, for example, nitrilotriacetic acid, ethylenedinitrilotetraacetic acid (also called ethylenediaminetetraacetic acid), propylenedinitrilotetraacetic acid, 1,2-cyclohexylenedinitrilotetraacetic acid (also called cyclohexanediaminetetraacetic acid), oxybisethylenenitrilotetraacetic acid, and the like.

The compounds 1,2-diaminocyclohexane, nitrilotriacetic acid an dethylenediaminetetraacetic acid are especially efficacious as stabilizing agents for use in the recovery of the di-substituted malonyl halides by distillation.

The di-substituted malonyl chloride reaction mixtures which have been prepared by the reaction of phosgene with di-substituted ketenes, such as dialkylketenes, are particularly suited to use in the process of the invention.

The mentioned group of stabilizing compounds can be used in the reaction mixtures in amounts of the order of about 0.005 to 20% based on the weight of crude product. A particularly useful range of concentration is 0.1 to 2%.

The conditions of distillation of the reaction mixture containing the di-substituted malonyl halides can be varied widely and a range of atmospheric pressure to sub-atmospheric pressure of the order of 10 mm. or less can be employed.

The di-substituted malonyl halides have the following general formula

wherein each X represents a halogen atom such as chlorine or bromine and $R_6$ and $R_5$ each represents a lower alkyl group of from 1 to 4 carbon atoms such as methyl, ethyl, propyl, butyl, sec.-butyl, iso-butyl, tert-butyl, or a monocyclic aryl group of the benzene series, e.g., phenyl, o-tolyl, m-tolyl or p-tolyl or aralkyl such as benzyl and β-phenethyl, or $R_6$ and $R_5$ joined together represent an alkylene radical of from 4 to 6 carbon atoms such as tetramethylene, —$(CH_2)_4$—, pentamethylene,

—$(CH_2)_5$— or hexamethylene, —$(CH_2)_6$—, radicals necessary to complete a carbocyclic ring of 5 to 7 carbon atoms such as present in tetramethylene malonyl bromide.

Representative dialkylmalonyl halides are dimethylmalonyl chloride, ethylmethylmalonyl chloride, methylpropylmalonyl chloride, butylmethylmalonyl chloride, diethylmalonyl chloride, ethylpropylmalonyl chloride, butylethylmalonyl chloride, ethylisobutylmalonyl chloride, dipropylmalonyl chloride, diisopropylmalonyl chloride, isopropylpropylmalonyl chloride, butylpropylmalonyl chloride, dibutylmalonyl chloride, di-tert-butylmalonyl chloride, tetramethylenemalonyl chloride (cyclopentane-1,1-dicarbonyl chloride), pentamethylenemalonyl chloride, hexamethylenemalonyl chloride, dimethylmalonyl bromide, ethylmethylmalonyl bromide, methylpropylmalonyl bromide, butylmethylmalonyl bromide, diethylmalonyl bromide, ethylpropylmalonyl bromide, butylethylmalonyl bromide, ethylisobutylmalonyl bromide, dipropylmalonyl bromide, diisopropylmalonyl bromide, isopropylpropylmalonyl bromide, butylpropylmalonyl bromide, dibutylmalonyl bromide, di-tert-butylmalonyl bromide, tetramethylenemalonyl bromide (cyclopentane-1,1-dicarbonyl bromide), pentamethylenemalonyl bromide and hexamethylenemalonyl bromide.

The process of the invention can be applied to the isolation of di-substituted malonyl halides from reaction mixtures prepared by different methods. That is, the method used for synthesis of the halides does not appear to be critical, e.g., dialkylketenes may be reacted with phosgene to produce a reaction mixture containing dialkylmalonyl chlorides. If desired, dialkylacetyl halides may be reacted with oxalyl halides as described in the examples below by the method of Treibs and Orttmann, Ber. 91 297–301 (1955). Alternately, dialkylmalonic acids may be reacted with thionyl halides or phosphorus halides to produce dialkylmalonyl halide reaction mixtures useful in the process of the invention. Accordingly, these reaction mixtures are distilled in the presence of one or more of the mentioned stabilizing agents. Distillation may be carried out either in metallic, glass or porcelain distillation apparatus to obtain high yields of dialkylmalonyl halides of high purity.

The full significance of our invention can be more readily understood by consideration of the examples below showing that the di-substituted malonyl halides isolated according to the process of our invention produce polymers having superior properties such as higher melting point, higher viscosity and better stability to hydrolysis.

The following examples will serve to illustrate the process of the invention embodying the isolation of di-substituted malonyl halides from crude reaction mixtures containing the same in the presence of the stabilizing compounds, such as ethylenediaminetetraacetic acid. Examples 1 and 2 illustrate results obtained in absence of the stabilizing compounds.

The dialkylketenes of the following examples are prepared by the method of the Kodak S.A. Belgian Patent 595,298 by pyrolysis of the corresponding dialkylacetic acid anhydrides.

EXAMPLE 1

*Synthesis of dimethylmalonyl chloride*

A solution of 183 g. (1.85 moles) of phosgene in 1 liter of chloroform is placed in a 2-liter flask which serves as the receiver of a dimethylketene generator. The solution is stirred and cooled to −35° C. in a Dry Ice-acetone bath, and dimethylketene is passed in for about thirty minutes [estimated 100 g. (1.4 moles) of dimethylketene] at temperatures between −10 and −35° C. After the addition is complete, the solution is allowed to warm gradually to about 10° C. and lose most of its yellow color.

*Distillation in absence of stabilizing compound*

A sample of 1000 parts of the crude reaction mixture prepared above is distilled at reduced pressure of 100 mm. No fraction corresponding to dimethylmalonyl chloride is obtained due to decomposition.

EXAMPLE 2

*Distillation in absence of stabilizing compound*

1000 g. of the crude material prepared in Example 1 is flash distilled at 10 mm. through a one-inch by twelve-inch Vigreux column. There is received 50 g. of material B.P. 30–40° C./10 mm. which is redistilled (B.P. 32–35° C./10 mm., 35 g.). A polyamide is prepared from the redistilled product by reaction with 1,4-cyclohexane-bis(methylamine) as described in Bell et al. U.S. Patent 3,012,994, granted December 12, 1961. The polyamide has an intrinsic viscosity of only 0.03 which is indicative of the use of a comparatively impure dimethylmalonyl chloride.

EXAMPLE 3

A mixture of 1000 parts of the crude dimethylmalonyl chloride of Example 1 and 10 parts of ethylenediaminetetraacetic acid is distilled at atmospheric pressure (735 mm.) through a 26-inch glass jacketed column packed with ¼″ Berl saddles. The following cuts are received at 15% takeoff:

| Cut | B.P. (° C.) | Parts, g. |
|---|---|---|
| 1 | up to 100 | 135 |
| 2 | 100–105 | 139 |
| 3 | 105–150 | 102 |
| 4 | 150–152 | 309 |
| 5 | 152–154 | 77 |
| Residue | | 205 |
| Loss and Holdup | | 43 |
| Total | | 1,000 |

Analysis of Cut 4 showed:

*Analysis.*—Calcd. for $C_5H_6Cl_2O_2$: Sapon. eq., 44.75. Found: Sapon. eq., 44.89.

A polyamide made from Cut 3 by the method of Example 2 has an intrinsic viscosity of 0.4 with good color (white) and melt characteristics.

EXAMPLE 4

An excess of phosgene is slowly added to 56 g. of distilled butylethylketene. The temperature during addition is maintained at 25–30° C. Excess phosgene is removed at reduced pressure. After seven weeks, distillation of the crude product at atmospheric pressure in the presence of 0.1 g. of nitrilotriacetic acid gives 95 g. (95% yield) of butylethylmalonyl chloride, B.P. 99° C. (10 mm.), 221–223° C. (atm.), $n_D^{20}$ 1.4601.

EXAMPLE 5

Methylpropylketene (B.P. 33.5° C. (78 mm.), $n_D^{20}$ 1.4084) on treatment with a slight excess of phosgene gives methylpropylmalonyl chloride. Distillation of 200 g. of the crude reaction mixture at atmospheric pressure with 1 g. of 1,2-cyclohexanediamine-N,N,N′,N′-tetraacetic acid gives 188 g. (94% yield) of purified methylpropylmalonyl chloride, B.P. 199–202° C., $n_D^{20}$ 1.4572.

EXAMPLE 6

Distillation of the addition product of 73 g. of ethylmethylketene and 90 g. of phosgene at atmospheric pressure over 0.005 g. of 1,10-phenanthroline gives 148 g. (94% yield) of ethylmethylmalonyl chloride, B.P. 173–175° C., $n_D^{20}$ 1.4539.

EXAMPLE 7

Refluxing of 15 parts of isobutyryl bromide, 10 parts of oxalyl bromide and 15 parts of carbon tetrachloride for 24 hr. gives on distillation at atmospheric pressure from 0.1 part of 4,4′-dimethyl-2,2′-bipyridine, 18 parts of dimethylmalonyl bromide, B.P. 197–200° C. (720 mm.).

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A process for recovery of a di-substituted malonyl halide having the general formula

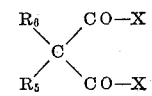

wherein X represents a halogen atom, $R_5$ and $R_6$ represent a member of the class consisting of a lower alkyl group and a monocyclic aryl group of the benzene series, and $R_5$ and $R_6$ joined together represent alkylene of 4 to 6 carbon atoms necessary to complete a carbocyclic ring of 5 to 7 carbon atoms from a crude mixture containing the same, which comprises distilling and condensing said halide overhead from the mixture in the presence of from about 0.005% to 20% based on the weight of said halide, of a stabilizing compound selected from the class consisting of (1) compounds having the general formula

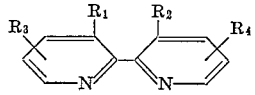

wherein $R_1$, $R_2$, $R_3$ and $R_4$ each equal a member of the class consisting of a hydrogen atom, lower alkyl groups, monocyclic aryl groups of the benzene series, halogen and lower alkoxy groups, $R_1$ and $R_2$ joined together represent a vinylene group necessary to complete a 1,10-phenanthroline radical, (2) compounds having the general formula $$R[N(CH_2CO_2H)_2]_n$$

wherein $n$ = a number from 1 to 2

$R$ = —$CH_2CO_2H$ where $n$ is 1, $R$ = a member of the class consisting of alkylene, cycloalkylene and oxydialkyl radicals of 2 to 10 carbon atoms where $n$ is 2.

2. A process for recovery of a di-substituted malonyl halide having the general formula

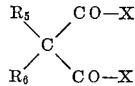

wherein X represents a halogen atom, $R_5$ and $R_6$ represent a member of the class consisting of a lower alkyl group and a monocyclic aryl group of the benzene series, and $R_5$ and $R_6$ joined together represent alkylene of 4 to 6 carbon atoms necessary to complete a carbocyclic ring of 5 to 7 carbon atoms from a crude mixture containing the same, which comprises distilling and condensing said halide overhead from the mixture in the presence of from about 0.005% to 20% based on the weight of said halide, of a stabilizing compound of the class consisting of 2,2'-bipyridine, 4,4'-diethyl-2,2'-bipyridine, 4,4'-diphenyl-2,2'-bipyridine, 4,4'-dichloro-2,2'-bipyridine, 4,4'-diethoxy-2,2'-bipyridine, 1,10-phenanthroline, 5-methyl-1,10-phenanthroline, 5-phenyl-1,10-phenanthroline, 5-chloro-1,10-phenanthroline, 2,9-dimethyl-1,10-phenanthroline, 4,7-diphenyl-1,10-phenanthroline, nitrilotriacetic acid, ethylenediaminetetraacetic acid, propylenedinitrilotetraacetic acid, cyclohexanediaminetetraacetic acid and oxybisethylenenitrilotetraacetic acid.

3. The process of claim 1 wherein the di-substituted malonyl halide of the crude mixture is obtained by the reaction of a dialkylketene with phosgene.

4. The process of claim 1 wherein the halide is a dialkylmalonyl chloride.

5. The process of claim 1 wherein the stabilizing compound is cyclohexanediaminetetraacetic acid.

6. The process of claim 1 wherein the stabilizing compound is nitrilotriacetic acid.

7. The process of claim 1 wherein the stabilizing compound is ethylenediaminetetraacetic acid.

8. A process for the recovery of dimethylmalonyl chloride from a crude mixture containing the same, which comprises distilling and condensing said chloride overhead from the mixture in the presence of ethylenediaminetetraacetic acid.

9. A process for the recovery of butylethylmalonyl chloride from a crude mixture containing the same, which comprises distilling and condensing said chloride overhead from the mixture in the presence of nitrilotriacetic acid.

10. A process for the recovery of ethylmethylmalonyl chloride from a crude mixture containing the same, which comprises distilling and condensing said chloride overhead from the mixture in the presence of 1,10-phenanthroline.

11. A process for the recovery of methylpropylmalonyl chloride from a crude mixture containing the same, which comprises distilling and condensing said chloride overhead from the mixture in the presence of cyclohexanediaminetetraacetic acid.

References Cited by the Examiner
UNITED STATES PATENTS

| | | | |
|---|---|---|---|
| 2,397,669 | 4/1946 | Kharasch | 260—544 |
| 2,884,454 | 4/1959 | Enk et al. | 260—544 X |

NORMAN YUDKOFF, *Primary Examiner.*